United States Patent
Russinovich

(10) Patent No.: US 12,341,895 B2
(45) Date of Patent: Jun. 24, 2025

(54) ZERO-KNOWLEDGE CONFIDENTIAL COMPUTING

(71) Applicant: Microsoft Technology Licensing, LLC, Redmond, WA (US)

(72) Inventor: Mark Eugene Russinovich, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 18/096,520

(22) Filed: Jan. 12, 2023

(65) Prior Publication Data

US 2024/0243917 A1 Jul. 18, 2024

(51) Int. Cl.
*H04L 9/32* (2006.01)
*G06F 21/53* (2013.01)

(52) U.S. Cl.
CPC ............ *H04L 9/3218* (2013.01); *G06F 21/53* (2013.01); *H04L 9/3236* (2013.01)

(58) Field of Classification Search
CPC ...... H04L 9/3218; H04L 9/3236; G06F 21/53
See application file for complete search history.

(56) References Cited

U.S. PATENT DOCUMENTS

| | | | | |
|---|---|---|---|---|
| 2019/0109707 A1* | 4/2019 | Ajoy | ..................... | H04L 9/0643 |
| 2022/0255931 A1* | 8/2022 | Avetisov | ................ | H04L 9/3263 |
| 2024/0037497 A1* | 2/2024 | Brown | .................... | G06V 30/19 |
| 2024/0275594 A1* | 8/2024 | Germouty | ............. | H04L 9/3073 |

OTHER PUBLICATIONS

Bingsheng Zhang, Succint Scruptable NIZK via Trusted Hardware, 2021, Zhejiang University, 1-22 (Year: 2021).*
Debes, et al., "ZEKRO: Zero-Knowledge Proof of Integrity Conformance." In Proceedings of the 17th International Conference on Availability, Reliability and Security, Aug. 2022, pp. 1-10.
International Search Report and Written Opinion received for PCT Application No. PCT/US2024/010005, Apr. 25, 2024, 14 pages.
Zhang, et al., "Succinct Scriptable NIZK via Trusted Hardware", In Computer Security—ESORICS 2021: 26th European Symposium on Research in Computer Security, Darmstadt, Germany, Oct. 8, 2021, pp. 430-451.

* cited by examiner

*Primary Examiner* — Linglan Edwards
*Assistant Examiner* — Jacob Benedict Knackstedt
(74) *Attorney, Agent, or Firm* — Alleman Hall & Tuttle LLP

(57) ABSTRACT

The disclosed technology is generally directed to zero knowledge confidential computing. In one example of the technology, via a prover, in a trusted execution environment, a private input and a public input are provided to a statement. The prover and the statement each include processor-executable code. Via the prover, in the trusted execution environment, execution of the statement is caused in the trusted execution environment such that the statement generates a result from at least the private input and the public input. Via the trusted execution environment, a measurement of the prover is signed and a measurement of the statement is signed. Via the prover, in the trusted execution environment, an attestation report is output. The attestation report includes the result, a commitment of the private input, the signed measurement of the prover, and the signed measurement of the statement. The attestation report does not include secret information.

20 Claims, 5 Drawing Sheets

ZERO-KNOWLEDGE CONFIDENTIAL COMPUTING

BACKGROUND

Zero Knowledge Proofs (ZKPs) are cryptographic protocols by which one party, a prover party, can prove to another, a verifier, that some statement is true. A ZKP reveals no knowledge to a verifier beyond the truth of a statement. For example, with a ZKP, a prover party can provide a proof that a particular customer has a bank account with a balance sufficient to make a payment of a certain amount without revealing the actual balance. ZKPs of this type are used by some types of cryptocurrency-based anonymous payments, which are stored in a public blockchain but reveal no information to third parties about the amount of a transaction or the parties involved, or the like.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is zero-knowledge confidential computing, as follows according to some examples. Via a trusted execution environment, a first private input and a first public input are received. Via a prover, in the trusted execution environment, statement inputs to a first statement are provided. The statement inputs include the first private input and the first public input. The prover includes processor-executable code. The first statement includes other processor-executable code. Via the prover, in the trusted execution environment, execution of the first statement is caused in the trusted execution environment such that the first statement generates a first result from at least the first private input and the first public input. Via the trusted execution environment, a measurement of the prover is signed. Via the trusted execution environment, a measurement of the statement is signed. Via the prover, in the trusted execution environment, a first attestation report is output. The first attestation report includes the first result, a commitment of the first private input, the signed measurement of the prover, and the signed measurement of the first statement. The first attestation report does not include secret information.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Zero-knowledge confidential computing (ZK-CC) may be used by a verifier to obtain a result from a prover party, such as determining whether a given statement is true, without revealing any secret information to the verifier. For example, zero-knowledge confidential computing may be used by a verifier to verify that an application has an account balance is above a particular threshold, without revealing any secret information to the verifier, such as the actual account balance of the applicant. The result and a proof of the result can be obtained by the verifier using properties of confidential computing (CC) to obtain the result without revealing secret information to the verifier, rather than using cryptographic computational integrity to do so in the manner done in conventional ZKPs.

The ZK-CC is performed as follows in some examples. The CC is performed by a prover. The verifier and the prover party agree on a statement, which is a program that provides an output result without revealing any secret information to the verifier. The statement is executed in a trusted execution environment (TEE) of the prover. The prover provides the output result, and the prover uses the TEE to generate an attestation of the prover code and the statement code and of the data supplied by the prover. The attestation is a proof of identity and a proof of the claims made by the prover. The verifier then validates the attestation using a public key of the TEE.

Illustrative Systems

Figure 1:
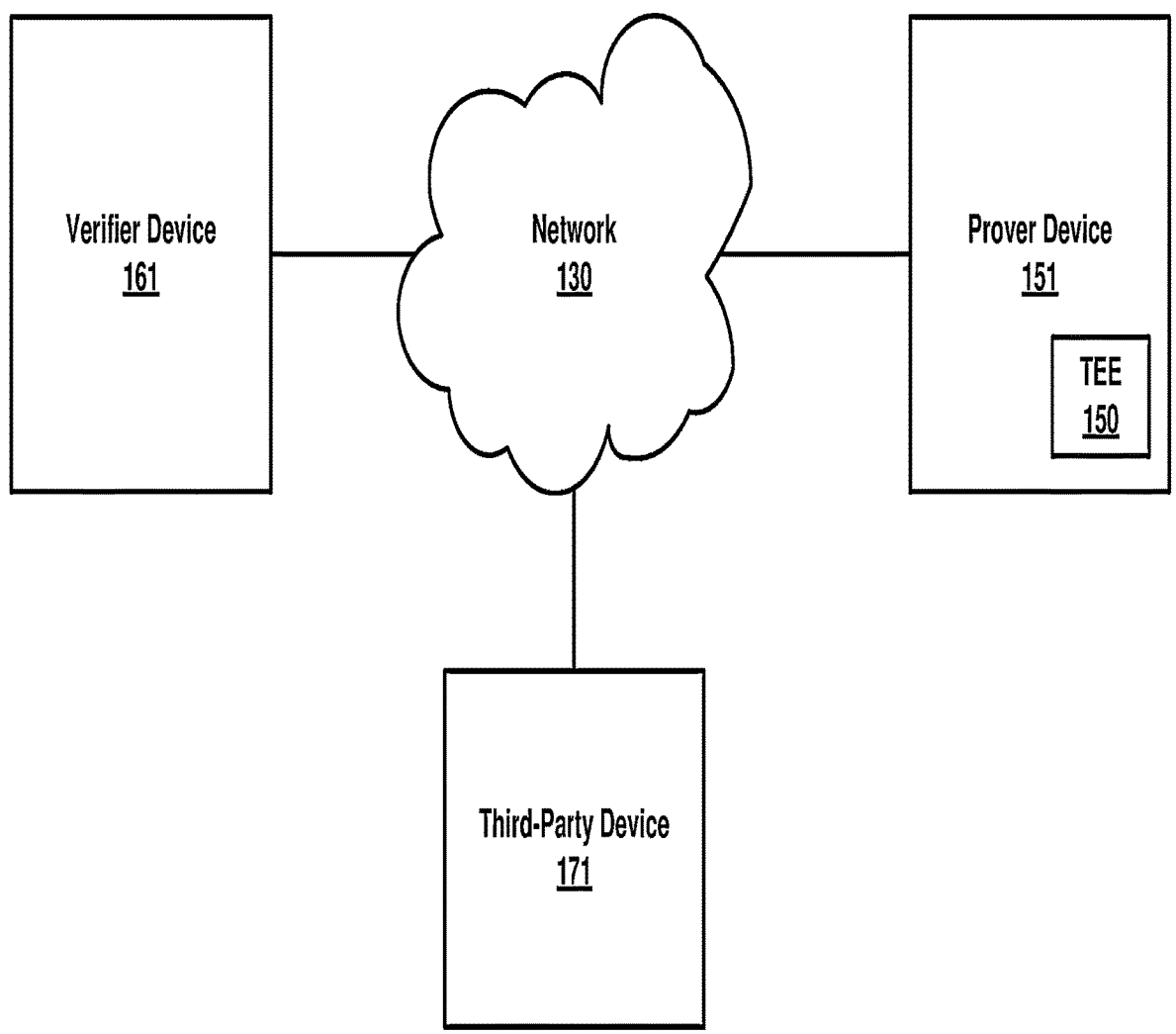
FIG. 1 is a block diagram illustrating an example of a network-connected system.

FIG. 1 is a block diagram illustrating an example of a system (100). FIG. 1 and the corresponding description of FIG. 1 in the specification illustrate an example system for illustrative purposes that does not limit the scope of the disclosure. System 100 includes network 130, as well as prover device 151, verifier device 161, and optional third-party device 171, which all connect to network 130. System 100 operates as follows in some examples.

Figure 5:
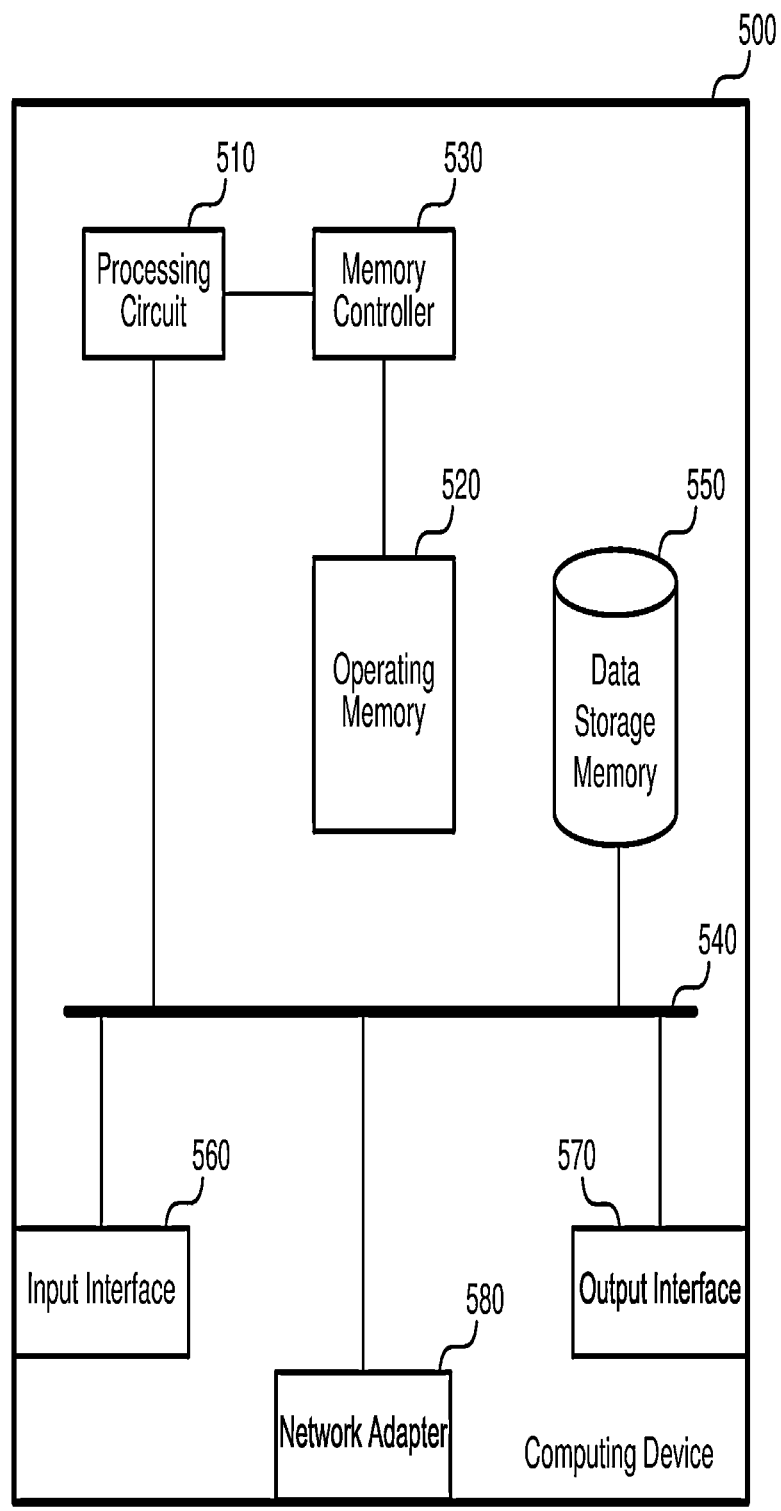
FIG. 5 is a block diagram illustrating one example of a suitable computing device, according to aspects of the disclosed technology.

Each prover device 151, verifier device 161, and third-party device 171 includes an example of computing device 500 of FIG. 5. Prover device 151 includes TEE 150. TEE 150 is a portion of a processor that is secure in a particular manner which, among other things, guarantees that code and data loaded inside of the TEE is protected with regard to confidentiality and integrity. A TEE includes hardware that ensures that the contents of a TEE are not visible to and cannot be modified by any party outside of the TEE, including hypervisors and other privileged software, and even those that may have access to the physical hardware of the TEE. A TEE includes a hardware root of trust. An example of a TEE is Intel® Software Guard Extensions.

Prover device 151 provides ZK-CC to verifiers. The ZK-CC enables a result and an attestation to be provided to a verifier without providing any secret information to the verifier. A verifier device, such as verifier device 161, is usable by a verifier to communicate with prover device 161 and to verify the attestation from prover device 151. Third-party device 171 is controlled by a third-party that is associated with ZK-CC results provided to verifiers. For instance, in some examples, prover device 151 provides ZK-CC results associated with bank accounts at a bank, and the third-party is the bank.

Prover device 151 and verifier device 161 agree upon a statement that provides the result. The statement includes processor-readable code that can generate the result. Verifier device 161 then subsequently communicates with prover device 151 to obtain a result from the statement. Prover device 151 executes the statement in TEE 150 and communicates an attestation report to verifier device 161 that includes the result generated by the statement and that further includes an attestation. In some examples, some of the information used by the statement may originate from and be signed by third-party device 171. Verifier device 161 verifies the attestation and uses the result generated by prover device 151 to make a decision. For instance, in some examples, the result generated by the statement is an indication as to whether the account balance of a particular customer exceeded a particular threshold amount, and the decision is a decision as to whether grant a loan to the particular customer.

Network 130 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, and/or other communications links known to those skilled in the art. Furthermore, remote computers and other related electronic devices could be remotely connected to either LANs or WANs via a modem and temporary telephone link. Network 130 may include various other networks such as one or more networks using local network protocols such as 6LoWPAN, ZigBee, or the like. In essence, network 130 may include any suitable network-based communication method by which information may travel among prover devices 151, verifier device 161, and third-party device 171. Although each device is shown connected as connected to network 130, that does not necessarily mean that each device communicates with each other device shown. In some examples, some devices shown only communicate with some other devices/services shown via one or more intermediary devices. Also, although network 130 is illustrated as one network, in some examples, network 130 may instead include multiple networks that may or may not be connected with each other, with some of the devices shown communicating with each other through one network of the multiple networks and other of the devices shown instead communicating with each other with a different network of the multiple networks.

System 100 may include more or less devices than illustrated in FIG. 1, which is shown by way of example only.

Figure 2:
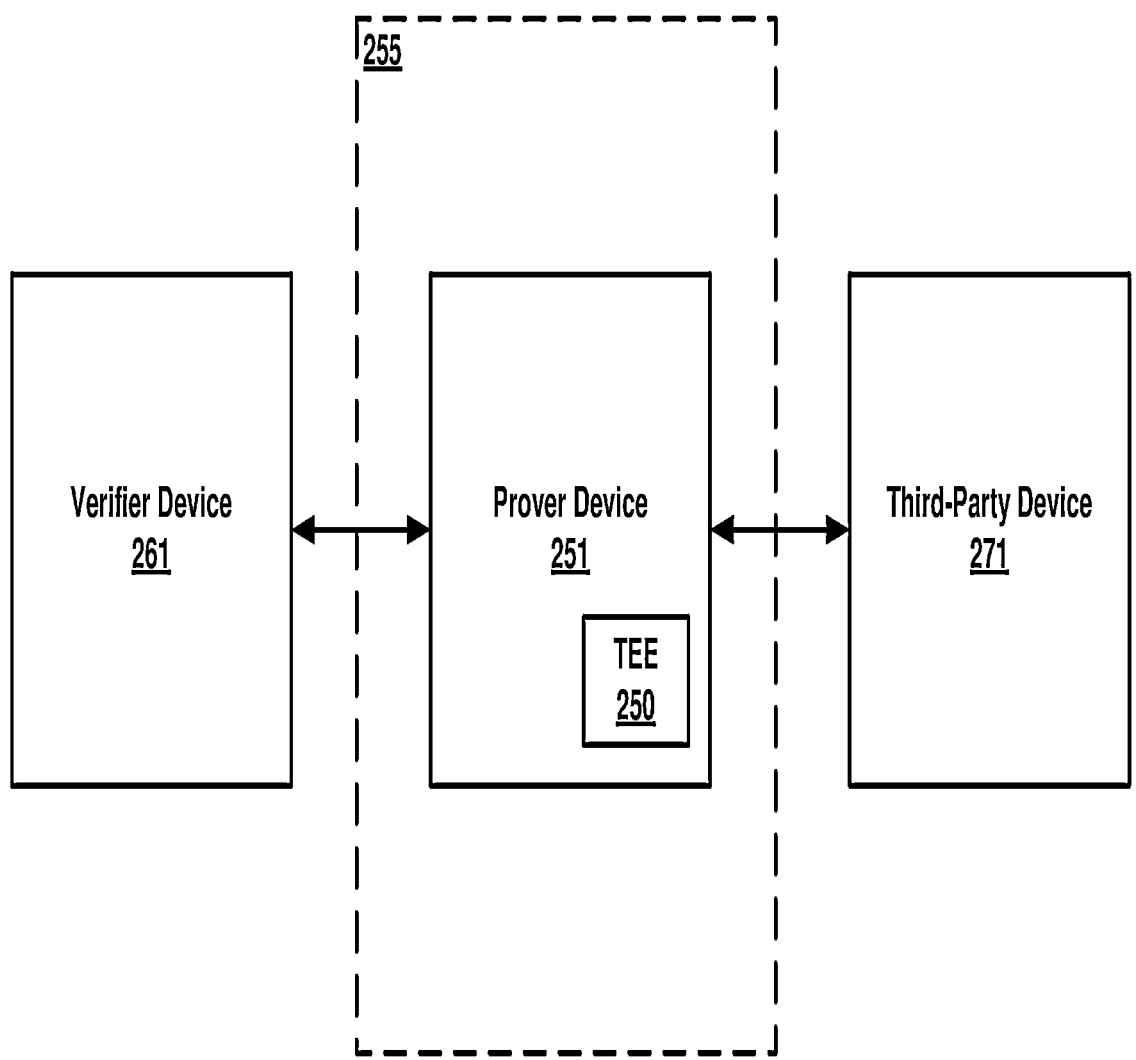
FIG. 2 is a block diagram illustrating an example of a system for zero-knowledge confidential computing.

FIG. 2 is a block diagram illustrating an example of a system (200). System 200 may be an example of system 100 of FIG. 1. System 200 is described as follows in accordance with some examples. System 200 includes prover system 255, verifier device 261, and third-party device 271. Prover system 255 includes prover device 251, and prover device 251 includes TEE 250.

A prover party may use prover system 255 to provide various services, including providing ZK-CC to one or more verifiers. The ZK-CC uses a statement that includes processor-executable code for execution in a TEE (such as TEE 250). The statement executing in the TEE provides an output result without revealing any secret information. Prover system 255 includes one or more devices, including prover device 251. The devices included in prover system 255 may include one or more distributed systems. One of the verifiers communicates with prover system 255 via verifier device 261.

Prover system 255 may have access to private data, and a verifier may wish to verify some aspect of data to which the prover has access. Prover system 255 may use ZK-CC to perform the verification without communicating any private information to the verifier. For example, a verifier may wish to determine whether to grant a loan to a particular customer. In order to make this determination, the verifier may wish to determine whether the particular customer has an account balance exceeding a particular threshold. Prover system 255 may use ZK-CC to communicate to the verifier a result that indicates whether the customer has an account balance exceeding the particular threshold, without communicating any private information to the verifier.

The precise services provided by prover system 255 may vary in different examples. In one example, prover system 255 provides a cloud service that has a library of trusted statements that it can deploy on-demand into a TEE. Examples of statements that may be used by the ZK-CC are as follows. One example statement determines whether a mortgage applicant has income within a certain range. Another example statement determines whether a job candidate has completed a certification or earned a degree, with optional information such as date and grade point average.

Another example statement determines whether an individual has certification or privilege to access information or a service without identifying the individual or the specific combination of properties used to enable access. For instance, one example statement determines whether an individual has both taken a training course and worked in the relevant area for at least three years. Another example statement determines whether an authorized set of individuals has agreed to a contract—without identifying the individuals. Another example statement is a machine-learning model that produces a certain prediction based on private inputs. Another example statement receives private voting inputs and yields an election result based on the private voting inputs.

Prover system 255 may communicate with one or more third parties for some of the inputs to the statement. For instance, one example statement determines whether a loan application has an account balance at a bank exceeds a particular threshold, and the bank is a third party. One of the third parties communicates with prover system 255 via third-party device 271.

In some examples, system 200 operates as follows. Verifier device 261 has the public key of TEE 250, so that verifier device 261 may verify any attestations made by prover device 251. The prover party and the verifier agree upon a statement to be executed on behalf of the verifier. In various examples, the statement may be provided by the prover party, by the verifier, or by a third party. Verifier device 261 requests, from prover system 255, execution of the agreed-upon statement. In response to the request, prover system 255 ensures that an appropriate device, such as prover device 251, is available to execute the statement.

For instance, in some examples, a single device is used by prover system 255. In other examples, prover system 255 includes one of more distributed systems, and prover system 255 instantiates enclaves on demand, where each of the enclaves is a device that includes a TEE. In some examples, prover system 255 manages or more pools of enclaves in order to deliver enclaves at scale. In some examples, an enclave pool acts as a resource where, upon receiving a request that requires an enclave, such as a ZK-CC request for the output of a particular statement, an enclave, such as prover device 251, can be fetched from the enclave pool by prover system 255 and allocated to an instance of the statement needed for the request. In some examples, the statement is provided to prover device 251. In some examples, prover device 251 already has the statement.

Prover system 255 causes the appropriate statement inputs to be provided to prover device 251. The inputs include, for example, private input(s), public input(s), and private commitment(s). For instance, in the case of a statement that determines whether a loan application has an account balance at a bank exceeds a particular threshold, the public input is the particular threshold, the private input is the account balance, and the private commitment is a hash of the account balance signed by the bank. For some statements, some of the inputs may be obtained via communication with third-party device 271.

In some examples, the private inputs are encrypted, and prover device 251 has access to a private key that prover device 251 uses to decrypt the private inputs. In some examples, the private inputs are not encrypted, but are accessible privately to the prover party and/or the third-party and not accessible to the verifier. After prover device 251 receives the appropriate inputs, prover device 251 verifies that the private inputs correspond to the private commitments. For instance, each of the private commitments may be a signed hash of a corresponding private input. In this example, prover device 251 takes a hash of each private inputs and verifies that the hash matches the corresponding private input.

Prover device 251 also causes the statement to execute in TEE 250, and passes the appropriate inputs and any required keys to the statement. The keys include, for example, any private keys required for decryption, any private keys required for signing, and any keys required to verify that the private inputs match the private commitments. The statement running in TEE 250 then provides an output result. The output result may include a Boolean value, a numeric value, a string, or another suitable type of output result. Prover code running in TEE 250 then performs TEE attestation. The TEE attestation includes a signed measurement of the prover code running in prover device 251 and a signed measurement of the statement code running in TEE 250. A "measurement" refers to a hash of the code or other output of a computational function or process applied to the code that may be used to verify that the code has not been changed.

Prover device 251 then communicates an attestation report to verifier device 261. The attestation report includes, for example, the signed measurement of the prover code, the signed measurement of the statement code, the public inputs, the private commitments, and the result of the execution of the statement, all chained to the hardware root of trust of TEE 250. The attestation report does not include any secret/private information. The term "commitment" refers to a cryptographic commitment, which is a cryptographic primitive that allows an entity to commit to a particular value (or statement) while keeping that value hidden from others. A cryptographic commitment has the properties of "binding" and "hiding." The binding property of a cryptographic commitment ensures that the commitment cannot be opened to more than one value. The hiding property of a cryptographic commitment ensures that the commitment provides no information about the committed value.

Upon receiving the attestation report, verifier device 261 performs verification. The verification performed by verifier device 261 includes verifying the signed code measurements in the attestation report, verifying the public inputs, and validating the private commitments. The verification of the signed code measurements is accomplished with the public key of TEE 250. The verification of the signed measurement of the prover code allows the verifier to be ensured that the prover code trusted by the verifier was executed. The verification of the signed measurement of the statement code allows the verifier to be ensured that the statement code trusted by the verifier was executed.

The verification of the public input enables the verifier to be assured that the correct public inputs were used in the execution of the statement. The validation of the private commitments enables the verifier to be ensured that the correct private inputs were used in the execution of the statement. The validation of the private commitment may include verifying that the hash correctly matches the expected hash and verifying the signature of the private commitment. Verifying the signature of the private commitment enables the verifier to be ensured that the private inputs were validated by the third party. Because the trusted prover code was run, the trusted statement code was run, the public inputs were correct, and the private input were correct, the verifier can trust that the result generated by the statement is correct.

Upon successful verification, verifier device 261 uses the result of the execution of the statement to make a decision. For example, if purpose of the result was for verifier device 261 to determine whether to grant a loan, verifier device 261 determines whether to grant the loan based on the result and any other applicable information.

The proof provided by the ZK-CC depends only on the size of the inputs, not on the size or complexity of a statement. Also, with ZK-CC, the time of verification is constant, and no overhead is required to execute a statement other than execution of the statement in a TEE.

Illustrative Processes

Figure 3:
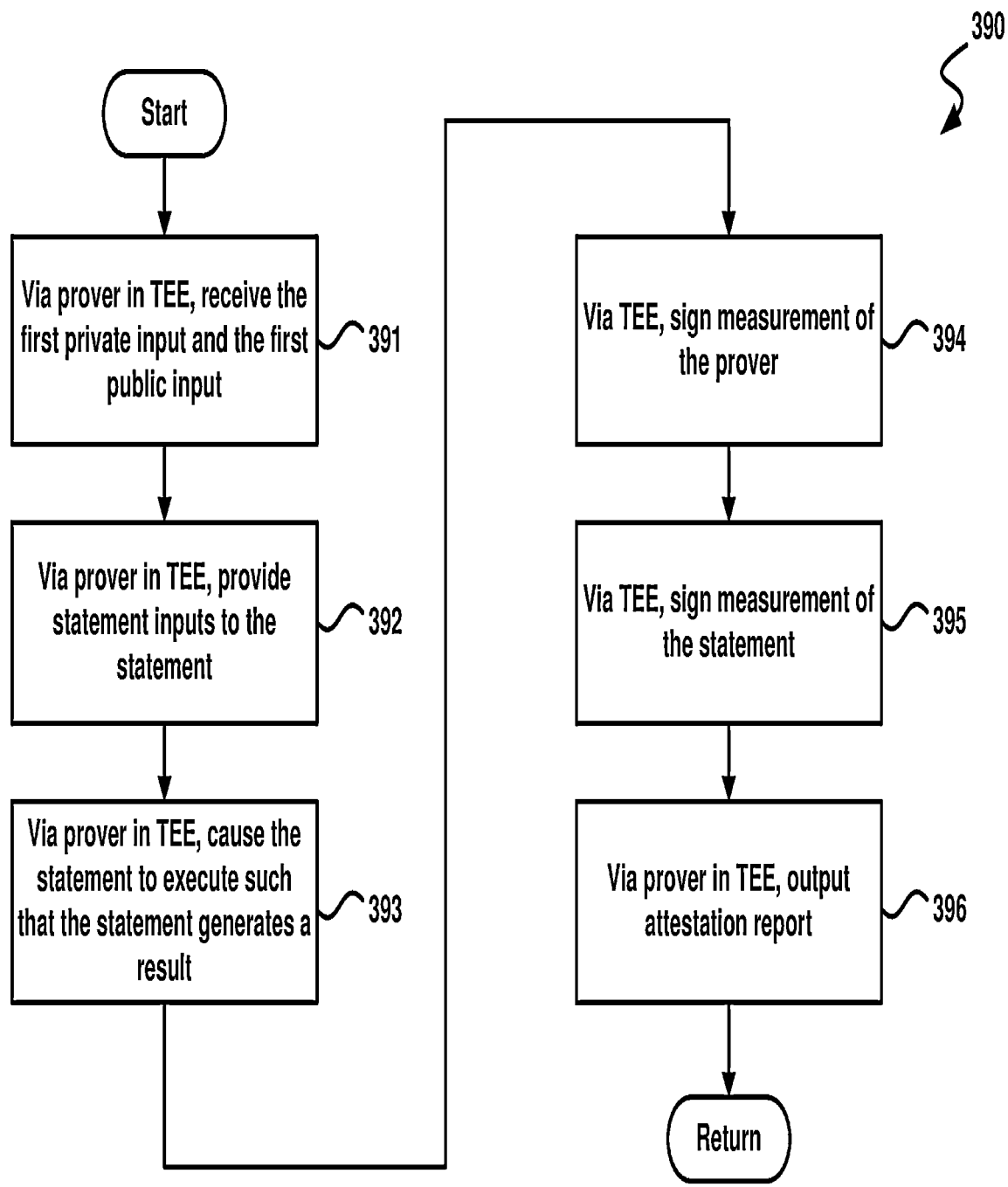
FIG. 3 is a flow diagram illustrating an example process for zero-knowledge confidential computing.

FIG. 3 is a diagram illustrating an example dataflow for a process (390) for zero-knowledge confidential computing. In some examples, process 390 may be performed by an example of one of the prover device 151 of FIG. 1, by an example of prover device 251 of FIG. 2, by an example of device 500 of FIG. 4, or the like. In some examples, process 390 proceeds as follows.

Step 391 occurs first. At step 391, via a trusted execution environment, a first private input and a first public input are received. In some examples, additional inputs may also be received, such as additional public inputs, additional private inputs, and commitments of each of the private inputs. As shown, step 392 occurs next. At step 392, via a prover, in the trusted execution environment, statement inputs to a first statement are provided. The statement inputs include the first private input and the first public input. The statement inputs may also include, for example, additional public inputs, additional private inputs, commitments of each of the private inputs, and private keys. The prover includes processor-executable code. The first statement includes other processor-executable code. As shown, step 393 occurs next. At step 393, via the prover, in the trusted execution environment, execution of the first statement is caused in the trusted execution environment such that the first statement generates a first result from at least the first private input and the first public input.

As shown, step 394 occurs next. At step 394, via the trusted execution environment, a measurement of the prover is signed. As shown, step 395 occurs next. At step 395, via the trusted execution environment, a measurement of the statement is signed. As shown, step 396 occurs next. At step 396, via the prover, in the trusted execution environment, a first attestation report is output. The first attestation report includes the first result, a commitment of the first private input, the signed measurement of the prover, and the signed measurement of the first statement. In some examples, the first attestation report may also include additional public inputs and commitments of any other private inputs. The first attestation report does not include secret information. The process may then advance to a return block, where other processing is resumed.

Illustrative Devices/Operating Environments

Figure 4:
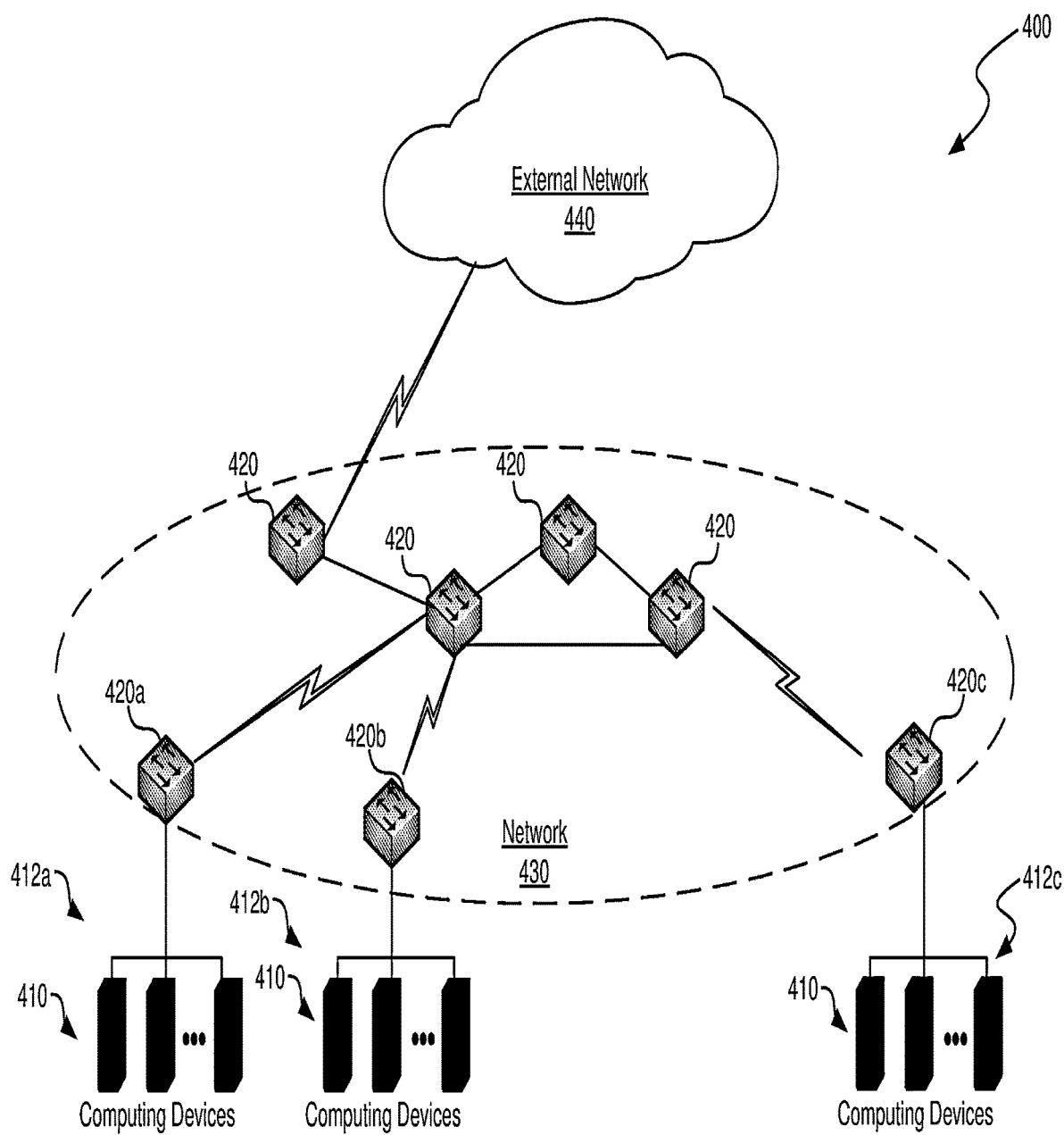
FIG. 4 is a block diagram illustrating one example of a suitable environment in which aspects of the technology may be employed.

FIG. 4 is a diagram of environment 400 in which aspects of the technology may be practiced. As shown, environment 400 includes computing devices 410, as well as network nodes 420, connected via network 430. Even though particular components of environment 400 are shown in FIG. 4, in other examples, environment 400 can also include additional and/or different components. For example, in certain examples, the environment 400 can also include network storage devices, maintenance managers, and/or other suitable components (not shown). Computing devices 410 shown in FIG. 4 may be in various locations, including a local computer, on premise, in the cloud, or the like. For example, computer devices 410 may be on the client side, on the server side, or the like.

As shown in FIG. 4, network 430 can include one or more network nodes 420 that interconnect multiple computing devices 410, and connect computing devices 410 to external network 440, e.g., the Internet or an intranet. For example, network nodes 420 may include switches, routers, hubs, network controllers, or other network elements. In certain examples, computing devices 410 can be organized into racks, action zones, groups, sets, or other suitable divisions. For example, in the illustrated example, computing devices 410 are grouped into three host sets identified individually as first, second, and third host sets 412a-112c. In the illustrated example, each of host sets 412a-112c is operatively coupled to a corresponding network node 420a-120c, respectively, which are commonly referred to as "top-of-rack" or "TOR" network nodes. TOR network nodes 420a-120c can then be operatively coupled to additional network nodes 420 to form a computer network in a hierarchical, flat, mesh, or other suitable types of topology that allows communications between computing devices 410 and external network 440. In other examples, multiple host sets 412a-112c may share a single network node 420. Computing devices 410 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 410 may be individually configured to provide computing, storage, and/or other suitable computing services.

In some examples, one or more of the computing devices 410 is a device that is configured to be at least part of a system for zero-knowledge confidential computing.

Illustrative Computing Device

FIG. 5 is a diagram illustrating one example of computing device 500 in which aspects of the technology may be practiced. Computing device 500 may be virtually any type of general- or specific-purpose computing device. For example, computing device 500 may be a user device such as a desktop computer, a laptop computer, a tablet computer, a display device, a camera, a printer, or a smartphone. Likewise, computing device 500 may also be a server device such as an application server computer, a virtual computing host computer, or a file server computer, e.g., computing device 500 may be an example of computing device 410 or network node 420 of FIG. 4. Likewise, computer device 500 may be an example any of the devices, a device within any of the distributed systems, illustrated in or referred to in any of the above figures, as discussed in greater detail above and below. As illustrated in FIG. 5, computing device 500 may include processing circuit 510, operating memory 520, memory controller 530, bus 540, data storage memory 550, input interface 560, output interface 570, and network adapter 580. Each of these afore-listed components of computing device 500 includes at least one hardware element.

Computing device 500 includes at least one processing circuit 510 configured to execute instructions, such as instructions for implementing the herein-described workloads, processes, and/or technology. Processing circuit 510 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 520 during run-time of computing device 500. Operating memory 520 may also include any of a variety of data storage devices/components, such as volatile memories, semi-volatile memories, random access memories, static memories, caches, buffers, and/or other media used to store run-time information. In one example, operating memory 520 does not retain information when computing device 500 is powered off. Rather, computing device 500 may be configured to transfer instructions from a non-volatile data storage component (e.g., data storage component 550) to operating memory 520 as part of a booting or other loading process. In some examples, other forms of execution may be employed, such as execution directly from data storage component 550, e.g., eXecute In Place (XIP).

Operating memory 520 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 510 via memory controller 530 in channels. One example of computing device 500 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 520 specifically does not include or encompass communications media, any communications medium, or any signals per se.

Memory controller 530 is configured to interface processing circuit 510 to operating memory 520. For example, memory controller 530 may be configured to interface commands, addresses, and data between operating memory 520 and processing circuit 510. Memory controller 530 may also be configured to abstract or otherwise manage certain aspects of memory management from or for processing circuit 510. Although memory controller 530 is illustrated as single memory controller separate from processing circuit 510, in other examples, multiple memory controllers may be employed, memory controller(s) may be integrated with operating memory 520, and/or the like. Further, memory controller(s) may be integrated into processing circuit 510. These and other variations are possible.

In computing device 500, data storage memory 550, input interface 560, output interface 570, and network adapter 580 are interfaced to processing circuit 510 by bus 540. Although FIG. 5 illustrates bus 540 as a single passive bus, other configurations, such as a collection of buses, a collection of point-to-point links, an input/output controller, a bridge, other interface circuitry, and/or any collection thereof may also be suitably employed for interfacing data storage memory 550, input interface 560, output interface 570, and/or network adapter 580 to processing circuit 510.

In computing device 500, data storage memory 550 is employed for long-term non-volatile data storage. Data storage memory 550 may include any of a variety of non-volatile data storage devices/components, such as non-volatile memories, disks, disk drives, hard drives, solid-state drives, and/or any other media that can be used for the non-volatile storage of information. However, data storage memory 550 specifically does not include or encompass communications media, any communications medium, or any signals per se. In contrast to operating memory 520, data storage memory 550 is employed by computing device 500 for non-volatile long-term data storage, instead of for run-time data storage.

Also, computing device 500 may include or be coupled to any type of processor-readable media such as processor-readable storage media (e.g., operating memory 520 and data storage memory 550) and communication media (e.g., communication signals and radio waves). While the term processor-readable storage media includes operating memory 520 and data storage memory 550, the term "processor-readable storage media," throughout the specification and the claims, whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 500 also includes input interface 560, which may be configured to enable computing device 500 to receive input from users or from other devices. In addition, computing device 500 includes output interface 570, which may be configured to provide output from computing device 500. In one example, output interface 570 includes a frame buffer, graphics processor, graphics processor or accelerator, and is configured to render displays for presentation on a separate visual display device (such as a monitor, projector, virtual computing client computer, etc.). In another example, output interface 570 includes a visual display device and is configured to render and present displays for viewing. In yet another example, input interface 560 and/or output interface 570 may include a universal asynchronous receiver/transmitter (UART), a Serial Peripheral Interface (SPI), Inter-Integrated Circuit (12C), a General-purpose input/output (GPIO), and/or the like. Moreover, input interface 560 and/or output interface 570 may include or be interfaced to any number or type of peripherals.

In the illustrated example, computing device 500 is configured to communicate with other computing devices or entities via network adapter 580. Network adapter 580 may include a wired network adapter, e.g., an Ethernet adapter, a Token Ring adapter, or a Digital Subscriber Line (DSL) adapter. Network adapter 580 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 500 is illustrated with certain components configured in a particular arrangement, these components and arrangements are merely one example of a computing device in which the technology may be employed. In other examples, data storage memory 550, input interface 560, output interface 570, or network adapter 580 may be directly coupled to processing circuit 510 or be coupled to processing circuit 510 via an input/output controller, a bridge, or other interface circuitry. Other variations of the technology are possible.

Some examples of computing device 500 include at least one memory (e.g., operating memory 520) having processor-executable code stored therein, and at least one processor (e.g., processing unit 510) that is adapted to execute the processor-executable code, wherein the processor-executable code includes processor-executable instructions that, in response to execution, enables computing device 500 to perform actions, where the actions may include, in some examples, actions for one or more processes described herein, such as the process shown in FIG. 3, as discussed in greater detail above.

The above description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud but are devices that serve as an entry point into enterprise or service provider core networks.

Conclusion

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

I claim:

1. An apparatus, comprising:
a device including at least one memory having processor-executable code stored therein, and at least one processor that is adapted to execute the processor-executable code, wherein the processor includes a trusted execution environment, and wherein the processor-executable code includes processor-executable instructions that, in response to execution, enable the device to perform actions, including:
receiving, via the trusted execution environment, a first private input and a first public input;
via a prover, in the trusted execution environment, providing statement inputs to a first statement, wherein the statement inputs include the first private input and the first public input, wherein the prover includes processor-executable code, and wherein the first statement includes other processor-executable code;
via the prover, in the trusted execution environment, causing execution of the first statement in the trusted execution environment such that the first statement generates a first result from at least the first private input and the first public input;
via the trusted execution environment, performing a prover verification hash of underlying prover code of the prover to assess whether the underlying prover code has been changed, and outputting a first result of the prover verification hash as a signed measurement of the prover;
via the trusted execution environment, performing a statement verification hash of underlying statement code of the first statement to assess whether the underlying statement code has been changed, and outputting a second result of the statement verification hash as a signed measurement of the first statement; and
via the prover, in the trusted execution environment, outputting a first attestation report, wherein the first attestation report includes the first result, a commitment of the first private input, the signed measurement of the prover, and the signed measurement of the first statement, each chained to a hardware root of trust of the trusted execution environment; and wherein the first attestation report does not include secret information.

2. The apparatus of claim 1, wherein the commitment of the first private input is a signed hash of the first private input.

3. The apparatus of claim 1, wherein the first result includes at least one of a Boolean value, a numeric value, or a string.

4. The apparatus of claim 1, wherein the statement inputs further include a plurality of additional public inputs.

5. The apparatus of claim 1, wherein the statement inputs further include a first private key.

6. The apparatus of claim 1, the actions further including receiving the first statement.

7. The apparatus of claim 1, wherein the first private input is encrypted, the actions further including decrypting the first private input.

8. The apparatus of claim 1, wherein the statement inputs further include the commitment of the first private input.

9. The apparatus of claim 8, the actions further including, via the prover, in the trusted execution environment, validating that the first private input corresponds to the commitment of the first private input.

10. The apparatus of claim 8, wherein the statement inputs further include: a plurality of additional private inputs and, for each private input of the plurality of additional private inputs, a commitment of that private input.

11. The apparatus of claim 10, the actions further including, via the prover, in the trusted execution environment, for each of the private inputs, validating that that private input matches the corresponding commitment of that private input.

12. A method, comprising:
via a trusted execution environment in a processor, receiving a first private input and a first public input;

communicating statement inputs to a first statement via a prover, in the trusted execution environment, wherein the statement inputs include the first private input and the first public input, wherein the prover includes processor-executable code, and wherein the first statement includes other processor-executable code;

via the prover, in the trusted execution environment, providing a first result from at least the first private input and the first public input by executing the first statement in the trusted execution environment such that the first statement generates a first result from at least the first private input and the first public input;

via the trusted execution environment, performing a prover verification hash of underlying prover code of the prover to assess whether the underlying prover code has been changed, and outputting a first result of the prover verification hash as a signed measurement of the prover;

via the trusted execution environment, performing a statement verification hash of underlying statement code of the first statement to assess whether the underlying statement code has been changed, and outputting a second result of the statement verification hash as a signed measurement of the first statement; and via the prover, in the trusted execution environment, communicating a first attestation report to a verifier, wherein the first attestation report includes the first result, a commitment of the first private input, the signed measurement of the prover, and the signed measurement of the first statement, each chained to a hardware root of trust of the trusted execution environment; and wherein the first attestation report does not include secret information.

13. The method of claim 12, wherein the commitment of the first private input is a signed hash of the first private input.

14. The method of claim 12, wherein the statement inputs further include the commitment of the first private input.

15. The method of claim 14, wherein the statement inputs further include: a plurality of additional private inputs and, for each private input of the plurality of additional private inputs, a commitment of that private input.

16. The method of claim 14, further comprising, via the prover, in the trusted execution environment, validating that the first private input corresponds to the commitment of the first private input.

17. A processor-readable storage medium, having stored thereon processor-executable code that, upon execution by at least one processor, enables actions, comprising:

via a prover, in the trusted execution environment, providing statement inputs to a first statement, wherein the statement inputs include a first private input and a first public input, wherein the prover includes processor-executable code, and wherein the first statement includes other processor-executable code;

via the prover, in the trusted execution environment, causing execution of the first statement in the trusted execution environment such that the first statement generates a first result from at least the first private input and the first public input;

causing the trusted execution environment to perform a prover verification hash of underlying prover code of the prover to assess whether the underlying prover code has been changed, and output a first result of the prover verification hash as a signed measurement of the prover;

causing the trusted execution environment to perform a statement verification hash of underlying statement code of the first statement to assess whether the underlying statement code has been changed, and output a second result of the statement verification hash as a signed measurement of the first statement; and outputting a first attestation report via the prover in the trusted execution environment, wherein the first attestation report does not include secret information, and wherein the first attestation report includes the first result, a commitment of the first private input, the signed measurement of the prover, and the signed measurement of the first statement, each chained to a hardware root of trust of the trusted execution environment.

18. The processor-readable storage medium of claim 17, wherein the commitment of the first private input is a signed hash of the first private input.

19. The processor-readable storage medium of claim 17, wherein the statement inputs further include the commitment of the first private input.

20. The processor-readable storage medium of claim 19, the actions further comprising, via the prover, in the trusted execution environment, validating that the first private input corresponds to the commitment of the first private input.

* * * * *